United States Patent [19]

Itakura

[11] Patent Number: 4,886,967
[45] Date of Patent: Dec. 12, 1989

[54] LIGHT BEAM SCANNING APPARATUS

[75] Inventor: Toru Itakura, Kanagawa, Japan

[73] Assignee: Fuji Photo Film Co., Ltd., Kanagawa, Japan

[21] Appl. No.: 90,626

[22] Filed: Aug. 28, 1987

[30] Foreign Application Priority Data

Aug. 28, 1986 [JP] Japan .................... 61-202381

[51] Int. Cl.⁴ ............................................ H04N 1/12
[52] U.S. Cl. .................... 250/327.2; 271/227
[58] Field of Search ............... 250/327.2, 484.1, 236, 250/235; 271/227, 261; 358/302

[56] References Cited

U.S. PATENT DOCUMENTS

| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,548,401 | 10/1985 | Nishikawa | 271/265 |
| 4,582,988 | 4/1986 | Aagano | 250/327.2 |
| 4,603,253 | 7/1986 | Nakagawa | 250/327.2 |
| 4,638,156 | 1/1987 | Horikawa et al. | 250/235 |
| 4,700,066 | 10/1987 | Horikawa | 250/234 |

FOREIGN PATENT DOCUMENTS

| 149175 | 11/1979 | Japan | 271/227 |
| 0011395 | 2/1981 | Japan | 250/327.2 |

Primary Examiner—Constantine Hannaher
Attorney, Agent, or Firm—Sughrue, Mion, Zinn, Macpeak & Seas

[57] ABSTRACT

A light beam scanning apparatus is provided wherein a sheet such as a stimulable phosphor sheet or photographic material undergoes two dimensional scanning by scanning the sheet with a deflected light beam to perform main scanning, and transferring the sheet in a direction perpendicular to the main scanning direction to perform sub-scanning, using two pairs of rollers synchronously driven to carry the sheet while clamping it therebetween. A sheet support member is located between the roller pairs and provided with at least two apertures in alignment with the main scanning line, and a photoelectric element is disposed in each of the apertures for receiving the light beam transmitted by the aperture, whereby any misalignment of the sheet can be detected.

5 Claims, 4 Drawing Sheets

LIGHT BEAM SCANNING APPARATUS

BACKGROUND OF THE INVENTION

This invention relates to a light beam scanning apparatus. More particularly, it relates to a light beam scanning apparatus wherein a subject to be scanned is scanned with a light beam in a two-dimensional manner, for example, a stimulable phosphor sheet having a radiation image stored therein is exposed to stimulating rays to perform reading or a photographic light-sensitive material is exposed to a light beam to record an image therein, and which includes means for detecting any positioning error including the position of the leading or trailing edge and/or the inclination of the stimulable phosphor sheet or photographic material prior to reading or recording.

One of typical prior art methods for obtaining radiation images as picture images is a radiation system using a radiation film having an emulsion layer comprising a silver halide photo-sensitive material in combination with a sensitizing paper. As a substitute for the radiation system, attention is recently drawn to a radiation image recording and reproducing system using a stimulable phosphor.

Certain phosphors, when exposed to radiation such as X-rays, $\alpha$-rays, $\beta$-rays, $\gamma$-rays, electron beams and ultraviolet rays, store part of the energy the radiation possesses. When the phosphor is subsequently exposed to a stimulating ray such as visible light, it produces stimulated emission corresponding to the stored energy. The phosphor exhibiting such properties is known as a stimulable phosphor.

There is proposed a system for recording and reproducing radiation image information using the stimulable phosphor. In such a system, the radiation image information of an object such as a human body is first stored in a sheet having a layer of stimulable phosphor (referred to as "stimulable phosphor sheet" or simply "phosphor sheet", hereinafter). The sheet is then scanned with stimulating rays which cause it to emit light in proportion to the radiation energy stored. The emitted light is detected by a photoelectric detector to obtain image signals as electrical signals. The image signals are processed to provide a radiation image of the object ready for diagnosis. Reference is made to U.S. Pat. Nos. 4,258,264, 4,276,473, 4,315,318, and 4,387,428 and Japanese Patent Application Kokai No. 56-11395.

The system of this type converts the radiation image information stored in the stimulable phosphor sheet into electrical signals, appropriately processes the signals, and outputs the processed signals as a visible image on a recording material such as photographic light-sensitive material or on a display such as a cathode ray tube (CRT), providing a radiation image having improved adaptability for image reading by observation or diagnostic adaptability.

The radiation image information recording/reproducing system includes an image reading unit for reading a radiation image stored in a stimulable phosphor sheet. The following is illustrative of the procedure for the reading unit to read the radiation image.

The stimulable phosphor sheet having a radiation image stored therein is scanned with a light beam such as a laser beam in a two-dimensional manner whereupon the resulting stimulated emission is sequentially detected in time series by a photoelectric detector such as a photomultiplier to obtain image signals. The two-dimensional scanning of light beam is accomplished, for example, by applying a linearly deflected light beam to the stimulable phosphor sheet to perform main scanning, and carrying the sheet in a direction substantially perpendicular to the main scanning direction by means of two pairs of synchronously driven rollers while clamping the sheet therebetween, thereby performing auxiliary scanning or sub-scanning. See Japanese Patent Application Kokai No. 62-94068 or U.S. Ser. No. 920,337.

Thereafter, the image information obtained as above is fed to an image recording unit. The image is recorded by modulating a laser beam in accordance with the image information derived from the stimulable phosphor sheet, and applying the modulated beam to a recording material in the form of a photographic light-sensitive material to thereby record the image in the photographic material. The photographic material having the image newly recorded therein is subjected to development and then collected in archives such that it may be accessible for medical diagnosis as required.

The image reading unit has the likelihood that the stimulable phosphor sheet is misaligned during the process of main scanning by the applied light beam. If the misaligned phosphor sheet is carried for sub-scanning by the two pairs of synchronously driven rollers, the positions for starting and/or finishing read scanning might be off the correct positions, or read scanning might be carried out on the phosphor sheet positioned at an angle to the scanning direction. Then the spot of a light beam on the phosphor sheet is off the desired spot. If scanning with laser beam is continued on the phosphor sheet inclined with respect to the two pairs of rollers, the resulting image information would be inaccurate. Differently stated, no correct radiation image information is derived from the wrongly positioned stimulable phosphor sheet. This can undesirably invite an error in medical diagnosis when the object is a patient.

In the image recording unit, an image can be recorded in a photographic light-sensitive material by exposing the photographic material to a modulated laser beam in a deflected fashion to effect main scanning, and carrying the sheet in a direction substantially perpendicular to the main scanning direction by means of two pairs of synchronously driven rollers while clamping the sheet therebetween to effect sub-scanning, thereby accomplishing two-dimensional scanning.

The image recording unit also has the likelihood that the photographic material is misaligned during the process of main scanning by the application of a laser beam modulated in accordance with the radiation image information stored as electrical signals. If the misaligned photographic material is carried for sub-scanning by the two pairs of synchronously driven rollers, then the spot of the laser beam is off the desired spot on the photographic material. The thus recorded image is inaccurate as including a loss of information. If the photographic material having such inaccurate image information recorded therein is used for medical diagnosis, there is the likelihood of incurring a wrong analysis.

SUMMARY OF THE INVENTION

A primary object of the present invention is to provide a light beam scanning apparatus which can ensure accurate and smooth reading or recording of an image.

Another object of the present invention is to provide a light beam scanning apparatus wherein two pairs of rollers are disposed such that they can carry a subject to be scanned such as a stimulable phosphor sheet or photographic light-sensitive material while clamping it therebetween, that is, at a spacing shorter than the length of the subject in its carrying direction and adapted to be synchronously driven; a support member is disposed at a predetermined position between the two pairs of rollers for supporting the subject at its rear surface, that is, the surface of the subject which is not exposed to the light beam; and the support member is provided with light beam-sensitive means for detecting the positions of starting and finishing main scanning for reading or recording of the subject and/or for detecting any positioning error of the subject including an inclination from the main scanning line.

The present invention is directed to a light beam scanning apparatus comprising means for continuously exposing a sheet-like subject to be scanned having substantially perpendicular longitudinal and transverse dimensions to a deflected light beam in a transverse direction to perform main scanning along a main scanning line; and means for transferring the subject in a longitudinal direction to perform sub-scanning, thereby accomplishing two dimensional scanning of the subject.

The light beam scanning apparatus according to the present invention further comprises means for detecting the position of the subject. The position detecting means includes at least two apertures in alignment with the main scanning line, and an element associated with each of the apertures for receiving the light beam transmitted by the aperture.

In one preferred embodiment, the transferring means includes two pairs of rollers for carrying the subject in its longitudinal direction while clamping it between each pair of rollers, the pairs of rollers being spaced a distance shorter than the longitudinal dimension of the subject, means for synchronously rotating the two pairs of rollers to perform sub-scanning, while the subject being exposed to a deflected light beam between the pairs of rollers to perform main scanning, and a member located between the pairs of rollers for supporting the subject. The apertures are perforated in the support member in alignment with the main scanning line.

In a further preferred embodiment, the light-receiving element may comprise a photoelectric element alone or a light guide and a photoelectric element attached thereto.

The light beam scanning apparatus of the invention can be combined with both radiation image information reading and recording units. In one preferred embodiment wherein the subject to be scanned is a stimulable phosphor sheet having radiation image information recorded therein and capable of producing photo-stimulated emission corresponding to the radiation image information when exposed to a light beam, the apparatus further comprises means for photoelectrically detecting the stimulated emission.

In another preferred embodiment, the subject to be scanned is a photographic light-sensitive material in which an image is recorded by exposure to a light beam.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

DESCRIPTION OF THE PREFERRED EMBODIMENTS

Figure 1:
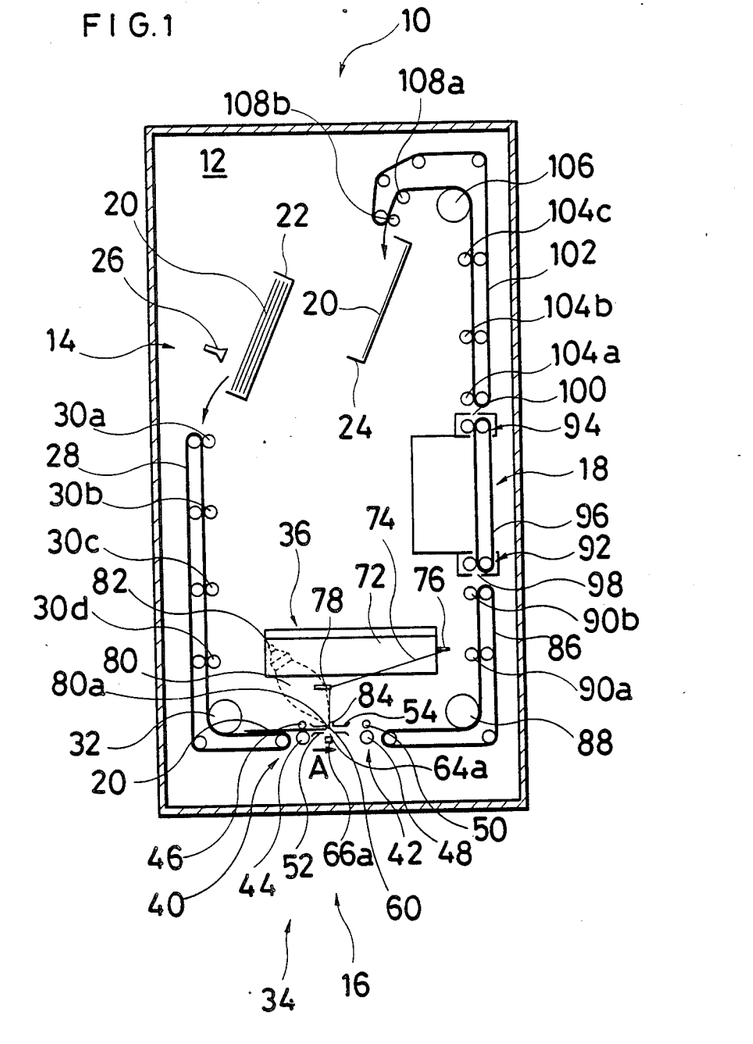
FIG. 1 is a schematic, partially in cross-section, view of a radiation image information reading unit having built therein a light beam scanning apparatus according to the present invention.
Figure 2:
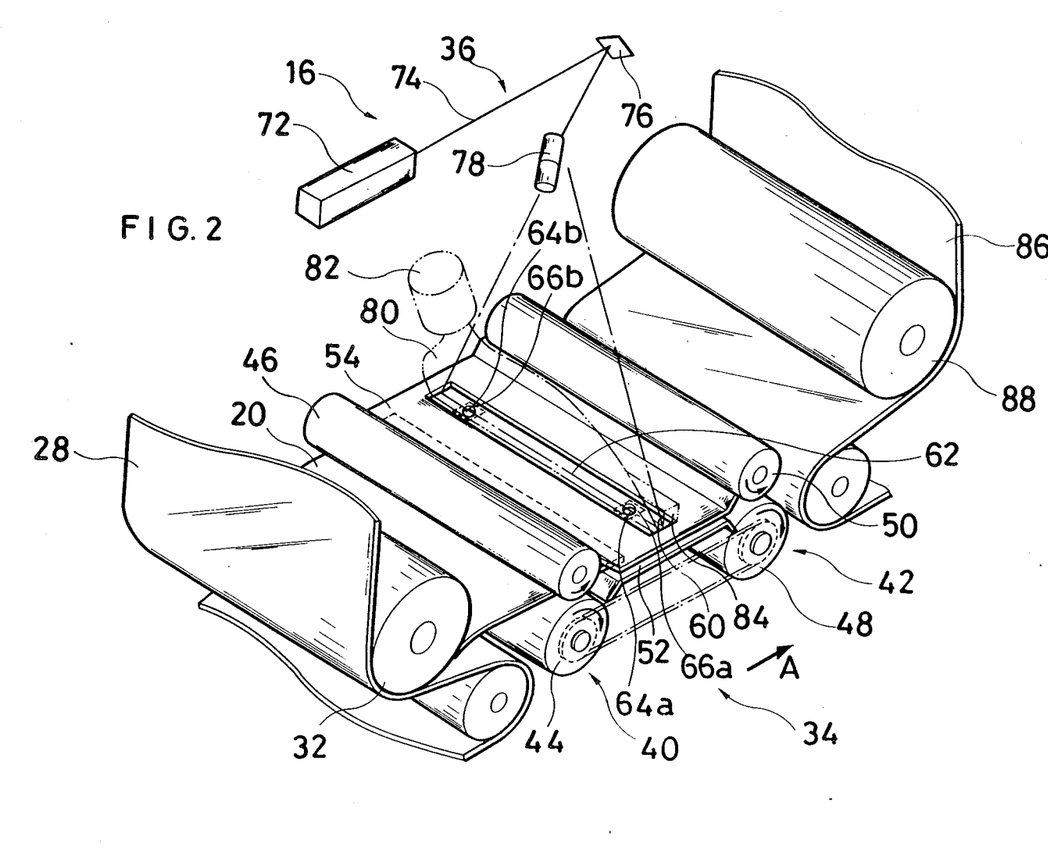
FIG. 2 is an enlarged perspective view of one preferred embodiment of the light beam scanning apparatus shown in FIG. 1.
Figure 3:
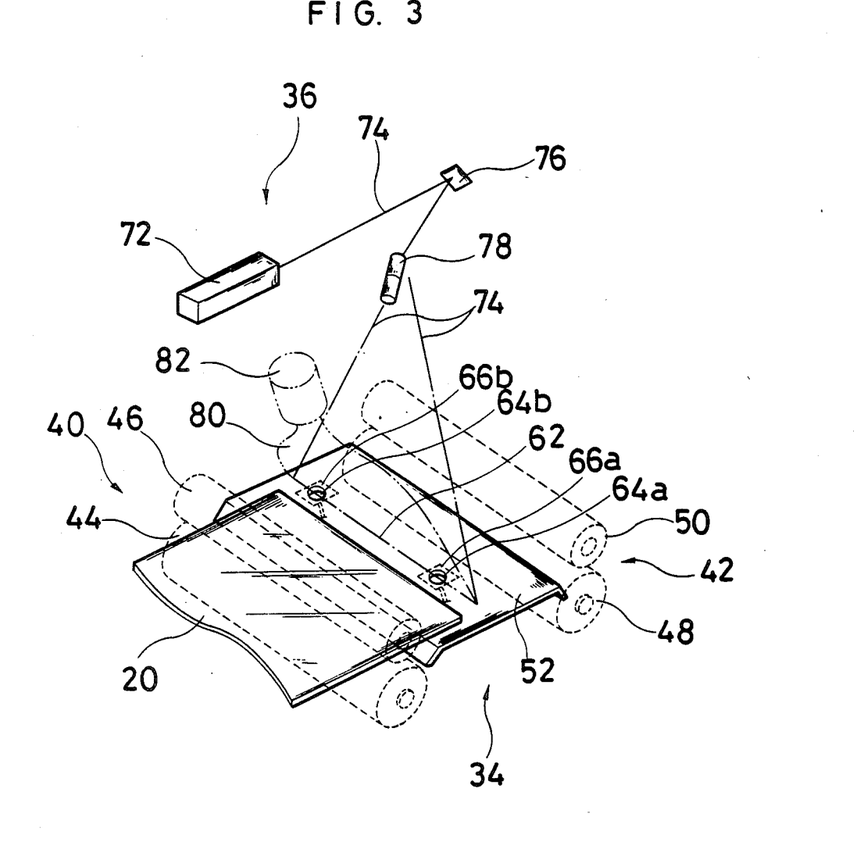
FIG. 3 is a perspective view similar to FIG. 2, illustrating light receiving means of the light beam scanning apparatus with the guide member removed.

Referring to FIGS. 1, 2 and 3, there is illustrated a radiation image information reading unit having incorporated therein a light beam scanning apparatus according to one preferred embodiment of the present invention.

The radiation image information reading unit 10 is illustrated as being confined in a housing or chamber 12. For brevity of description, the housing 12 is vertically upright in the illustration of FIG. 1. The unit includes a stock section 14, a light beam scanning apparatus 16, an erasing section 18, and carrying means all disposed in the chamber 12.

The stock section 14 includes a supply magazine 22 for containing a stack of a plurality of stimulable phosphor sheets 20 and a receiver magazine 24 to be described later. The sheet is of a rectangular shape having longitudinal and transverse dimensions and intended herein to be carried in its longitudinal direction. The supply magazine 22 is disposed on the left side in the chamber 12 so that the stimulable phosphor sheets 20 each having radiation images stored and recorded therein are received in the magazine 22 in a stack fashion. Disposed adjacent the supply magazine 22 is a sheet delivery or leafing mechanism in the form of a suction pad 26. Disposed below the suction pad 26 is a first endless conveyor belt 28 for carrying the stimulable phosphor sheet 20.

The first conveyor belt 28 extends vertically downward along the left wall of the housing to the lower left corner thereof where it turns substantially at right angles and then extends horizontally. Arranged in contact with the vertical portion of the first conveyor belt 28 are plural vertically spaced-apart pairs of rollers 30a, 30b, 30c, 30d. A larger diameter roller 32 is disposed inside the turn of the first conveyor belt 28. Located at a distance from the termination of the first conveyor belt 28 is a sheet transfer mechanism for sub-scanning 34 which constitutes the light beam scanning apparatus 16 according to the present invention.

As shown in FIGS. 1, 2 and 3, the light beam scanning apparatus 16 of the present invention includes a reading section 36 for performing light beam exposure, main scanning, and reading operations and the sheet sub-scanning transfer mechanism 34.

The sheet sub-scanning transfer mechanism 34 includes first and second pairs of rollers 40 and 42 which are located in a horizontal plane and spaced a distance shorter than the longitudinal dimension of the stimulable phosphor sheet 20 in its transfer direction by a predetermined distance.

As best shown in FIG. 2, the first roller pair 40 consists of a roller 44 of a relatively large diameter rotating in a predetermined direction, clockwise as viewed in the figures and another roller 46 adapted to rotate together in sliding contact therewith. The second roller pair 42 consists of a roller 48 of the same diameter as the roller 44 also rotating clockwise and another roller 50 adapted to rotate together in sliding contact therewith. The rollers 44, 46 and 48, 50 are disposed such that they cooperate to carry the sheet 20 while clamping it therebetween without sliding motion. In the preferred embodiment, the large diameter rollers 44 and 48 are rotated by means of a common drive through a belt or chain as shown by phantom lines in FIG. 2. This mechanism enables synchronous rotation of the rollers 44 and 48.

As illustrated in FIG. 2, disposed between the first and second roller pairs 40 and 42 is a support member 52 for supporting the storage phosphor sheet 20 on its lower side. The support member 52 extends in substantial alignment with the line connecting the highest points of the rollers 44 and 48. A guide member 54 is disposed above the support member 52. The guide member 54 extends parallel to the support member 52 and is spaced apart from the support member 52. The guide member 54 is provided with a slot or opening 60 which extends in a direction perpendicular to the sheet transfer direction shown by arrow A.

A reading section 36 is disposed above the sheet subscanning transfer mechanism 34. The reading section 36 includes a light source 72 for emitting a laser beam 74, and a mirror 76 and a galvanometer mirror 78 both located such that the laser beam 74 from the source 72 may be directed onto the sheet through the slot 60 for the purpose of scanning the sheet. The sheet 20 is scanned with the laser beam 74 along a straight line 62 in alignment with the slot 60, the line being referred to as a main scanning line, hereinafter. At the position where the sheet is scanned with the laser beam 74, an optical guide 80 is disposed such that its incident end 80a is directed to the main scanning line 62 through the slot 60. A photomultiplier 82 is coupled to the upper portion of the optical guide 80. A light collecting reflection mirror 84 is opposed to the incident end 80a of the optical guide 80 with respect to the main scanning line 62. The reflection mirror 84 serves to efficiently guide the stimulated emission originating from the sheet 20 toward the incident end 80a.

Generally opposed to the first conveyor belt 28 and diposed adjacent the second roller pair 42 is a second conveyor belt 86. The second conveyor belt 86 extends horizontally a predetermined distance to the lower right corner of the housing where it turns substantially at right angles and then extends vertically upward toward the erasing section 18. In the illustrated embodiment, a larger diameter roller 88 is disposed inside the turn of the second conveyor belt 86. Plural vertically spaced-apart pairs of rollers 90a, 90b are arranged in contact with the vertical portion of the second conveyor belt 86.

The erasing section 18 includes a plurality of erasing light sources (not shown) in the interior, inlet and outlet pairs of rollers 92 and 94 for carrying the sheet 20 into and away from the erasing section 18, and an endless conveyor belt 96 vertically extending between the inlet and outlet roller pairs 92 and 94. The erasing section 18 is enclosed in a shield which prevents leakage of the erasing light from the erasing light sources to the outside of the erasing section 18. The shield is provided with an opening 98 disposed adjacent the inlet roller pair 94 facing the terminal of the second conveyor belt 86 and another opening 100 allowing the sheet 20 to be carried away from the erasing section 18.

A third endless conveyor belt 102 is disposed in an upper right portion of the chamber and in proximity to the outlet opening 100 of the erasing section shield. The belt 102 extends vertically upward a predetermined distance to the upper right corner of the housing 12 where it turns substantially at right angles, then extends horizontally, and terminates at a somewhat descending end. In the illustrated embodiment, plural vertically spaced-apart pairs of rollers 104a, 104b, 104c are arranged in contact with the vertical portion of the third conveyor belt 102. A larger diameter roller 106 is disposed inside the turn of the third conveyor belt 102. Rollers 108a, 108b are arranged along the descending terminal portion of the third conveyor belt 102. With the arrangement of these rollers, the sheet 20 is carried vertically upward, turned horizontally, and then carried vertically downward. Disposed adjacent the roller 108b is the receiver magazine 24 for receiving stimulable phosphor sheets 20 in a stack manner.

The present invention is characterized by the provision of sheet position detecting means in the radiation image information reading unit 10 described above or image information recording unit of similar construction. Preferably, the sheet position detecting means includes apertures and light-sensing elements associated with the support member so as to receive the scanning light beam. More particularly, the support member 52 is provided with openings at positions where a light beam passing across the main scanning line 62 reaches. In the embodiment shown in FIGS. 2 and 3, the support member 52 is perforated with two spaced-apart small apertures 64a and 64b at positions corresponding to the slot in the guide member 54. While two apertures are present in the embodiment shown in FIGS. 2 and 3, three or more apertures may be formed as appropriate. A light receiving element is disposed within each of the apertures at a position where the element can receive the light beam passing across the main scanning line 62. In the embodiment shown in FIGS. 2 and 3, light receiving elements 66a and 66b are disposed in the apertures 64a and 64b, respectively.

The light receiving elements may be any elements which can receive light such as laser light and convert it into an electrical signal. Preferably, they are photoelectric elements such as photo-diodes and photo-transistors as well as photo-sensors possessing an electronic circuit having such elements incorporated therein.

Figure 4:
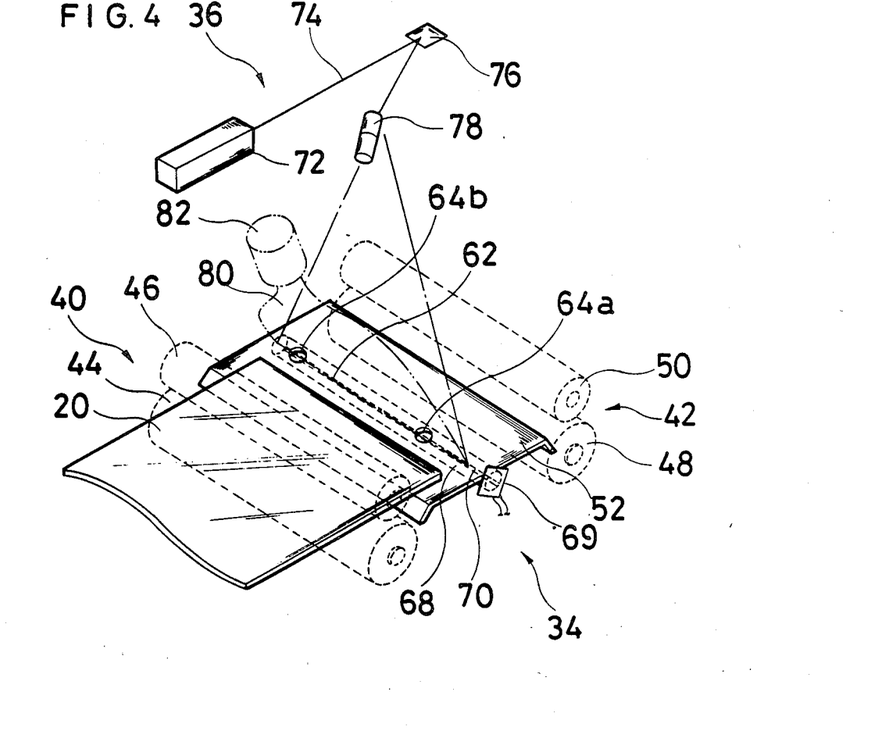
FIG. 4 is a perspective view similar to FIG. 3, illustrating another embodiment of the light receiving means of the light beam scanning apparatus.
Figure 4A:
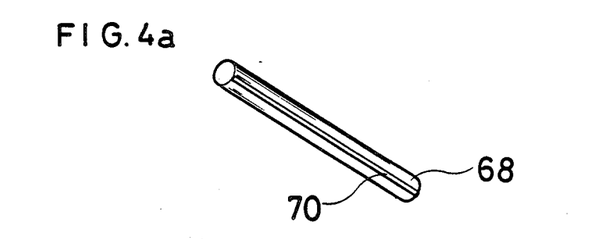
FIG. 4a is a perspective view of a light collecting bar shown in FIG. 4.

The sheet position detecting means for detecting any positioning errors relating to the leading and trailing edges of a stimulable phosphor sheet including misalignment and inclination by utilizing a light beam running across the main scanning line 62 is not limited to the above-mentioned embodiment. An alternative embodiment is shown in FIG. 4 wherein a light-receiving element is comprised of a light guide and a photoelectric element. More particularly, as shown in FIG. 4, a light guide 68 is disposed below the support member 52 and extends at least from one aperture 64a to the other aperture 64b in alignment with the main scanning line 62. A photoelectric element 69 is attached to one end of the light guide 68. The light guide 68 used herein is an elongated tubular bar having optical conducting means, disposed opposite to an incident side, in the form of a white diffusion band 70 for transmitting the light having passed through the aperture to the photoelectric element 69 as shown in FIG. 4a.

The openings are each comprised of a small aperture in the illustrated embodiment while they may be taken together as a slit-like opening extending parallel to the main scanning line over approximately the same distance or a plurality of spaced-apart slit-like openings arranged along the main scanning line. The size and number of openings or apertures are not critical insofar as they do not disturb the transfer of sheets and the passage of light to the associated light-receiving element.

In the embodiment shown in FIGS. 1 to 4, the support member which supports the lower surface of the sheet to be scanned is separately provided between two pairs of rollers constituting the sheet sub-scanning transfer mechanism. The support member may be constructed as an apertured belt member extending between the two pairs of synchronously driven rollers. The support member of any other construction may also be used as long as it can support the lower surface of the sheet to be scanned and provide openings by which a laser beam can be transmitted.

In the embodiment shown in FIGS. 1 and 2, the guide member 54 is disposed between the two pairs of synchronously driven rollers 40 and 42. The guide member 54 may be omitted or replaced by any desired member as long as a sheet-like element to be scanned, typically a stimulable phosphor sheet 20 or a photographic light-sensitive material can be carried from the upstream roller pair 40 to the downstream roller pair 42 smoothly or without any inconvenience.

The radiation image recording/reproducing system uses a radiation image information recording unit in order that the radiation image information once stored in the stimulable phosphor sheet is permanently recorded. More particularly, a photographic light-sensitive material is exposed to a modulated laser beam to record an image corresponding to the radiation image information. It will be readily understood that when the sheet sub-scanning transfer mechanism 34 of the above-illustrated embodiment is applied to the radiation image information recording unit, the photographic light-sensitive material may be transferred accurately and smoothly, ensuring that a more accurate image is recorded in the photographic light-sensitive material.

Although the light beam scanning apparatus of the present invention has been described with reference to its preferred embodiments, modifications and changes may be made thereto without departing from the intended scope of the present invention. Although the most commonly used sheet is rectangular one having a longitudinal dimension equal to or longer than a transverse dimension, the sheet may have any desired contour wherein its edges need not be straight.

Operation

The radiation image information reading unit having the light beam scanning apparatus of the present invention incorporated therein is essentially of the above-described construction. Its operation will be described below.

Referring to FIG. 1 again, at the outset, the radiation image information reading unit 10 is loaded with the supply magazine 22 which has received therein a plurality of stimulable phosphor sheets 20. Each of the sheets has already recorded therein a radiation image of an object such as a human body.

Every sheet 20 is individually taken out of the supply magazine 22 by the action of the leafing mechanism in the form of the suction pad 26. It is then carried in its longitudinal direction by the first conveyor belt 28 cooperating with a plurality of rollers 30a–30d, 32 until it reaches the sheet sub-scanning transfer mechanism 34 of the light beam scanning apparatus 16. The sheet 20 is transferred in the direction of arrow A while being clamped by the first roller pair 40, that is, between the rollers 44 and 46.

At this point, the reading section 36 is turned on to actuate the light source 72. A laser beam 74 originating from the source 72 is once reflected by the mirror 76 to the galvanometer mirror 78. The swing motion of the galvanometer mirror 78 moves the laser beam 74 along the main scanning line 62 on the support member 52 to perform linear scanning. During scanning, the beam passes through the apertures 64a and 64b in the support member 52 in alignment with the main scanning line 62 and enters the light-receiving elements 66a and 66b just below the apertures.

Now, the sheet 20 comes to the scanning position. If the leading edge of the sheet 20 reaches the main scanning line 62 without a positioning error, then it blocks the apertures 64a and 64b at the same time to interrupt the laser beams 74 to the light-receiving elements 66a and 66b. In response to the simultaneous interruption of light, the light-receiving elements 66a and 66b simultaneously produce signals to detector means which confirms accurate transfer of the sheet 20 and initiates reading of the radiation image information in the sheet 20. Thereafter, the stimulable phosphor sheet 20 is continuously scanned with the laser beam 74 with the aid of the swing motion of the galvanometer mirror 78. Non-directional photo-stimulated emission generated from the sheet upon exposure to the scanning laser beam enters the optical guide 80 directly and after being reflected by the reflection mirror 84. It is then converted into an electrical signal by the photomultiplier 82, which is delivered to an image recording unit, for example.

If the leading edge of the sheet 20 reaches the main scanning line 62 with a positioning error as being inclined to the line, then either one of the apertures 64a and 64b is blocked prior to the other to interrupt the laser beam 74 associated with the one aperture. Then the light-receiving elements 66a and 66b produce signals with a time lag. The degree of inclination of the sheet with respect to the main scanning line is then detected. Based on this information, it is possible to interrupt reading of the radiation image information in the sheet 20, if desired. Alternatively, it is possible to feed back the sheet when the detected degree of inclination exceeds a preset threshold value. The sheet is repositioned in correct alignment without inclination or positional error and then subjected to reading operation again, enabling correct reading of the radiation image information born in the stimulable phosphor sheet.

In this way, the stimulable phosphor sheet 20 undergoes two-dimensional scanning with the laser beam 74 while it is carried in the direction of arrow A by the clamping and rotating action of the second pair of rollers 42. As the sheet passes the reading section 36, all the image information stored in the sheet is read out.

When the trailing edge of the stimulable phosphor sheet 20 has passed the main scanning line 62, the laser beam 74 is transmitted by the apertures 64a and 64b again. The light-receiving elements 66a and 66b receive the transmitted light, detecting the end of reading of radiation image information in the sheet.

It is possible to carry out reading operation over the entire surface of the sheet 20 by advancing the sheet with some inclination relative to the main scanning line. In this case, the read-out image information is once stored in a memory and corrected for the degree of inclination, obtaining a corrected image.

The upstream and downstream roller pairs 40 and 42 constituting the sheet transferring/sub-scanning mechanism 34 are located at a spacing shorter than the longitudinal dimension of the stimulable phosphor sheet 20 and driven synchronously or at the same revolution according to the present invention. The sheet is first clamped between the first pair of rollers 40 and carried in the direction of arrow A. The sheet is moved forward while a following portion thereof is being clamped between the first pair of rollers 40, and the leading edge of the sheet is smoothly led to the second roller pair 42. The sheet is clamped between the second pair of rollers 42 and carried further forward in the direction of arrow A. The sheet is always clamped by at least one of the roller pairs 40 and 42 during its movement across the transfer mechanism, preventing the sheet from being moved away from the desired transfer direction. During its overall movement from the entry of its leading edge to the first pair of rollers 40 to the release of its trailing edge from the second pair of rollers 42, the stimulable phosphor sheet 20 is smoothly and accurately carried without incurring a positioning error, ensuring highly accurate reading of the radiation image in the sheet by the reading section 36.

Furthermore, the support and guide members 52 and 54 are located between the first and second pairs of rollers 40 and 42. While being carried from the first to the second pair of rollers, the sheet 20 is properly guided by the support and guide members 52 and 54, also ensuring that the leading edge of the sheet be smoothly led to the second pair of rollers 42.

The guide member 54 is provided with the elongated slot 60 through which the laser beam 74 is passed to the sheet 20. When the stimulable phosphor sheet 20 having a radiation image of an object just recorded therein is transferred to the reading section 36, the afterglow of the instantaneous emission from the sheet upon exposure to radiation is prevented by the guide member 54 from entering the optical guide 80.

It was observed that a stimulable phosphor sheet produces stimulated emission in accordance with the stored or recorded radiation image when exposed to a laser beam, and the stimulated emission does not extinguish instantaneously, but remains on the sheet for a certain time as a stimulated emission afterglow as disclosed in U.S. Pat. No. 4,582,988 assigned to the same assignee as the present invention and incorporated herein by reference. In the preferred embodiment of the present invention, however, the stimulated emission afterglow is interrupted by the guide member 54 from entering the optical guide 80 as is the instantaneous emission afterglow mentioned above. The guide member 54 which prevents stimulated emission afterglow and instantaneous emission afterglow from entering the optical guide 80 in this way ensures that more clear and accurate data of the radiation image information are obtained from the stimulable phosphor sheet 20.

The stimulable phosphor sheet 20 is then delivered to the second conveyor belt 86 located adjacent the second pair of rollers 42. It is carried to the erasing section 18 by the second converyor belt 86 via the rollers 88, 90a, 90b. It is fed into the erasing section 18 by the pair of rollers 92 via the inlet opening 98 and carried to the outlet pair of rollers 94 by the conveyor belt 96. At this point, a plurality of light sources (not shown) in the erasing section 18 are turned on to flood light onto the sheet to completely erase the radiation image remaining therein. The sheet in which the radiation image has been erased is taken out of the erasing section 18 by the pair of rollers 94 through the outlet opening 100. It is carried to the upper portion of the radiation image information reading unit 10 by the third conveyor belt 102 via the rollers 104a–104c, and then turned around into the receiver magazine 24 via the rollers 106, 108a, 108b.

Although the foregoing description is made in conjunction with the preferred embodiment using two pairs of nip rollers, the invention is not limited thereto. The transferring means may be an endless belt for conveying a stimulable phosphor sheet in a longitudinal direction. In this embodiment, two apertures are given by two slits formed in the belt in its longitudinal direction.

I claim:

1. A light beam scanning apparatus comprising:
 means for continuously exposing a sheet-like subject to be scanned having subsequently perpendicular longitudinal and transverse dimensions to a deflected scanning light beam in a transverse direction to perform main scanning along a main scanning line; means for transferring said subject in a longitudinal direction along a transfer path to perform sub-scanning so as to accomplish two-dimensional scanning of said subject;
 at least two apertures associated with said transferring means, said apertures being in alignment with said main scanning line and disposed in said transfer path so as to be covered by said sheet-like subject during movement thereof;
 an element associated with each of said apertures for receiving light from said scanning light beam transmitted by said apertures and for producing block signals each indicating blockage of one of said apertures; and
 means for detecting a time lag of block signals produced by said light-receiving element associated with each of said two apertures, and for determining if said time lag is greater than a predetermined time lag resulting from movement of said scanning light beam during main scanning, thereby detecting inclination of said subject,
 said transfer means includes:
 two pairs of rollers for carrying said subject in its longitudinal direction while clamping it between each pair of rollers, said pairs of rollers being spaced a distance shorter than the longitudinal direction of said subject,
 means for synchronously rotating said two pairs of rollers to perform sub-scanning, while the subject being exposed to a deflected light beam between said pair of rollers to perform main scanning, and
 a member located between said pairs of rollers for supporting said subject, said apertures being perforated in said support member.

2. The apparatus of claim 1 wherein said light-receiving element is a photoelectric element.

3. The apparatus of claim 1 wherein said light-receiving element comprises a light guide and a photoelectric element attached thereto.

4. The apparatus of claim 1 wherein said subject to be scanned is a stimulable phosphor sheet having radiation image information recorded therein, the sheet emitting light corresponding to the radiation image information when exposed to stimulating rays, wherein the apparatus further comprises means for photoelectrically detecting the light.

5. The apparatus of claim 1 wherein said subject to be scanned is a photographic light-sensitive material in which an image is recorded by exposure to a light beam.

* * * * *